United States Patent Office 2,804,540
Patented Aug. 27, 1957

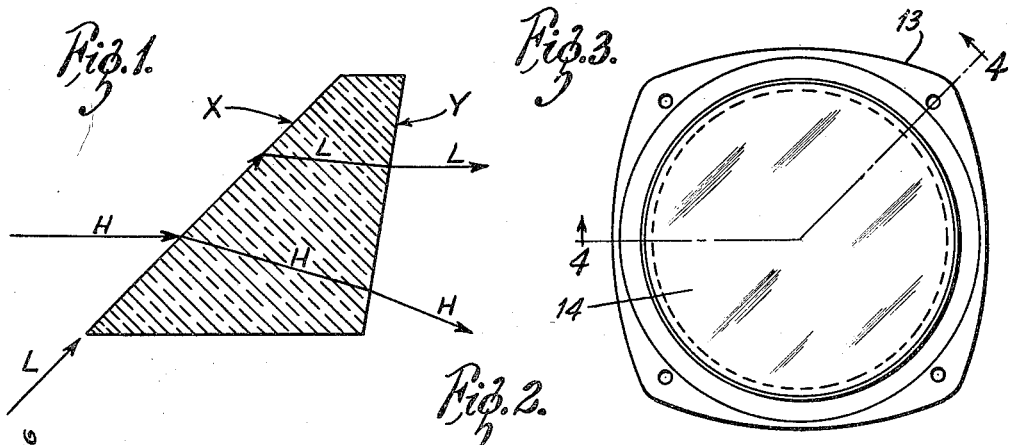
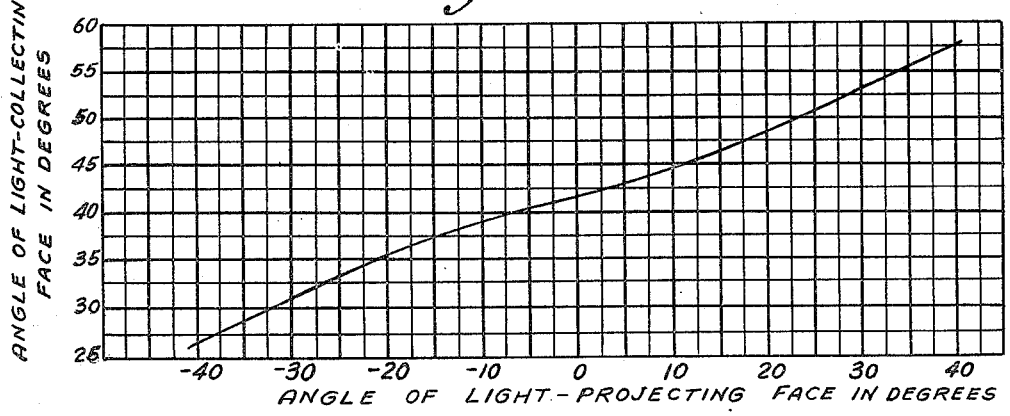
THEORETICAL ANGLES FOR LIGHT-COLLECTING AND LIGHT-PROJECTING FACES OF "LUCITE" OR "PLEXIGLAS" PRISMS TO CONFINE PROJECTED RAYS BELOW HORIZONTAL
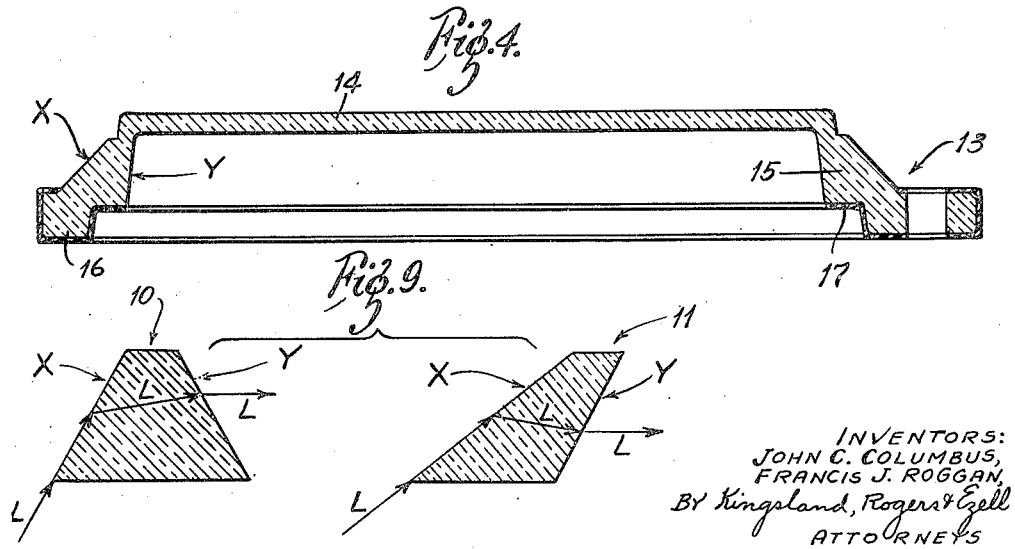
INVENTORS:
JOHN C. COLUMBUS,
FRANCIS J. ROGGAN,
BY Kingsland, Rogers & Ezell
ATTORNEYS

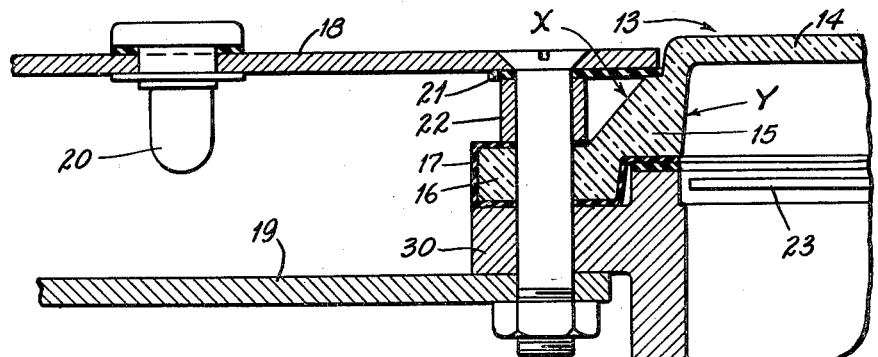
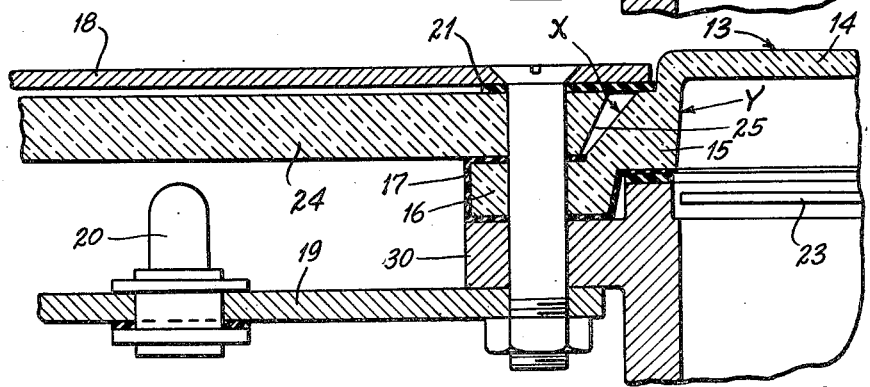
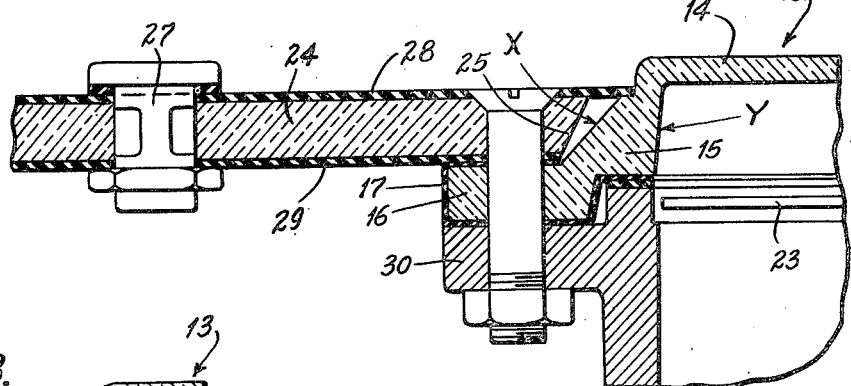
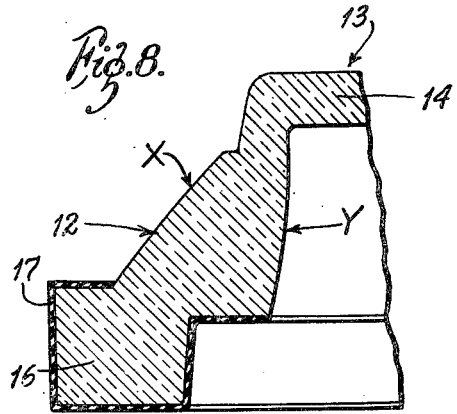

2,804,540

GLARE PREVENTING ILLUMINATING SHIELD

John C. Columbus, Ferguson, and Francis J. Roggan, St. Anns, Mo.

Application July 30, 1952, Serial No. 301,732

6 Claims. (Cl. 240—8.16)

This invention relates to devices for preventing glare in the illumination of objects by artificial light and, in particular, to glare-preventing means for use in connection with the illumination of instrument dials and the like.

The illumination of instrument dials, particularly in panel installations comprising several instruments, as normally employed in aircraft, automobiles, and ships, involves two major problems, the first of which is to provide uniform and effective illumination of the instrument dials, and the second of which is to prevent any direct light from the illuminating means, together with undesirable reflected light, from being projected beyond the confines of the instruments and panel into the eyes of the observer. (For want of a better definition, direct and reflected light from such instrument installations which does not contribute to the dial illumination, but which reaches the eyes of the observer, is referred to herein as glare.) In the past, it has been possible to overcome the first problem reasonably well, but the success realized in that direction has been nullified to a great extent by lack of a solution of the second problem. It has been found, particularly in modern present-day aircraft, which have numerous instruments in highly complex panel installations, that the glare inherent in the instrument illumination produces eye fatigue to a serious extent in the observer and thus is a major factor in many accidents caused by pilot error.

This invention, however, provides a new and novel shielding means whereby the illumination of such instrument dials is greatly improved and glare is practically eliminated by directing the light rays from their source onto the dials in such manner that said rays are confined within a predetermined boundary, such as the transparent cover of each instrument, and are thus not visible to the observer. This novel shielding means is adapted to be interposed between the sources of illumination and each instrument dial, and comprises essentially a prismatic light-refracting element of frusto-conical configuration through which all light from the source which reaches the dial must pass. As will be shown hereinafter, this shielding means may be constructed in many different forms. In particular, the angular configuration of the prismatic element may vary within certain limits according to this invention, but in all such cases the rays of light entering the prismatic element from the source of illumination will be refracted and directed in such manner that the aforementioned result will be attained.

Accordingly, the primary object of this invention is to provide a shielding means for use in the illumination of an instrument dial whereby light from a source of illumination will be directed onto said dial and will not be projected beyond a predetermined boundary so that only the illuminated dial will be visible to an observer.

Another object of this invention is to provide such a shielding means which can be interposed around an instrument dial between said dial and a transparent cover whereby the usual glare produced by a portion of the dial-illuminating light being reflected from the outer surface of said cover will be prevented.

Another object of this invention is to provide such a shielding means whereby the illuminating rays can be concentrated on and directed to desired areas of the instrument dial.

Another object of this invention is to provide such shielding means which can be interposed around an instrument dial between spaced panels so that the sources of illumination can be located in the space between said panels.

Still another object of this invention is to provide such a shielding means having inherent characteristics which will permit the utmost latitude in its detail configuration and arrangement so that it may be adapted to various instrument-panel configurations and arrangements.

These and further objects and modifications of this invention will appear more fully hereinafter from a consideration of the detailed description which follows, taken together with the accompanying drawings, wherein several embodiments of the invention are illustrated. It is to be especially understood, however, that the drawings are for the purpose of illustration only and are not to be interpreted as limitations to this invention, reference being had primarily for this purpose to the appended claims.

In the drawings, wherein like reference characters refer to like parts throughout the several views:

Fig. 1 is a cross-sectional elevation of a typical prism utilized in this invention illustrating the refraction of light therethrough;

Fig. 2 is a graph showing the different angular designs for the faces of the prism utilized in this invention for one particular material;

Fig. 3 is a plan view of an instrument cover which may embody the instrument shield of this invention;

Fig. 4 is a cross-section in elevation along the line 4—4 of the device of Fig. 3;

Fig. 5 is a cross-sectional view taken in elevation of one embodiment of this invention comprising a source of illumination, the shield and the instrument dial;

Fig. 6 is a cross-sectional view taken in elevation of a source of illumination, the shield and the instrument dial, showing a different embodiment of this invention;

Fig. 7 is a cross-sectional view taken in elevation of an illuminating source, the shield and the instrument dial showing still another modification of this invention;

Fig. 8 is a cross-sectional view taken in elevation of a modified form of prism which may be used as the shield of this invention; and Fig. 9 is a cross-sectional view taken in elevation of two prisms made according to the graph of Fig. 2.

Referring now to the drawings in general and Fig. 1, in particular, the optical principle of the refraction of light by prism, which is embodied in the shielding device of this invention, will now be particularly described.

The principle and the manner in which it is employed in this invention is illustrated basically in Fig. 1 wherein a transparent prism having a light collecting face X and a light-projecting face Y is provided. For reasons which appear hereafter, the light-collecting face X in this illustration is inclined at an angle of forty-five degrees. For purposes of illustration and description, all angles between the vertical and the face of the prism which lie in the first quadrant will be taken as positive, and all angles between the vertical and the face of the prism which lie in the second quadrant will be taken as negative.

The light-projecting face Y is inclined at an angle of nine degrees from the vertical, both of the inclinations of the faces X and Y being in the same general direction as shown. It is contemplated that, in this invention, analogous prismatic sections will normally be constructed of clear plastic material, such as are commonly known by the name Lucite or Plexiglas, both of which have an index of refraction of approximately 1.5. It is obvious that other transparent materials may be used in the prisms of this invention, such as glass or other transparent plastic materials, although, of course, slight modifications will be made due to the varying indices of refraction for the respective materials used.

When light is directed generally onto the face X of the prism shown in Fig. 1, the rays may strike the face from any angle within a range of one hundred and eighty degrees. Horizontal rays H striking the face X will be projected downward, in this case, from the face Y at an angle of approximately twenty-one degrees below the horizontal and any rays striking the face X at a downward angle obviously will be projected dowward from the face Y at angles greater than twenty-one degrees. Rays striking the face X at an upward angle will be projected from the face Y at some angle less than twenty-one degrees. The extreme theoretical angular limit from which a ray can strike the face X in an upward manner is forty-five degrees, i. e., along the face X, although this is an upper limit that cannot actually occur since such a ray would be directed upward parallel to the face X, but since this is a theoretical limit, it is assumed that such a condition could exist. In such a theoretical case, or in such situations closely approaching the theoretical, the limiting ray L would be projected horizontally from the face Y, as is shown in Fig. 1.

The geometrical construction of the paths of a horizontal ray and the limiting ray through the prism and from the face Y thereof is shown in Fig. 1, as described above, where it is noted that the angular relationship of the two faces X and Y of the prism has been established so that the limiting ray L along the face of the light collecting face X will be projected horizontally from the face Y. It should also be noted that, by this particular relationship, an observer looking at the face Y from any point above a horizontal line or plane defining the top of the prism would not see any light projected from the face Y and no glare whatsoever would be observable. By this means, the face Y would be completely dark to the observer as if no light at all were being projected therefrom, and it is by this means that one of the principal features of this invention has been made possible.

The graph of Fig. 2 shows the relationship between the angular disposition of the light-collecting face X and the light-projecting face Y for a wide range of prismatic sections that can be used in this invention. Two such illustrations of the prismatic sections which may be used according to the design configurations of Fig. 2 are shown in Fig. 9. In this graph, the angle of the light-collecting face taken with a line vertical with the base of the prism is plotted in degrees as the ordinate against the angle of the light-projecting face as the abscissa, also taken from a vertical line projecting from the base in degrees. These are the theoretical angles required for a limiting ray which passes parallel to the light-collecting face and is refracted through the prism in such a manner that all the rays projected from the prisms are necessarily confined in a horizontal plane or below this plane downwardly. In this graph, as has been pointed out above, all angles which fall in the first quadrant are taken as positive while all the angles falling in the second quadrant are taken as negative for convenience in illustration.

As is shown for purposes of illustration in Fig. 9, prism 10 has, corresponding to the graph of Fig. 2, a light-collecting face X which is disposed at an angle of thirty-one degrees and a light-projecting face Y which is disposed at a negative angle of minus thirty degrees. Likewise, prism 11, which is of markedly different shape, has an angle of fifty-three degrees for the light-collecting face X and an angle of plus thirty degrees for the light-projecting face Y, but it can be seen that in both of these prisms the same result is obtained, i. e., the limiting ray L is projected along the horizon away from the light-projecting face. A prism can therefore be easily chosen from the graph of Fig. 2, which will cause the major portion of the projected light to be directed downwardly at a desired angle and, at the same time, confine all of the projected light below a horizontal plane.

Once the angle that the light-collecting face X makes with the horizon plane, designated as X′, and the index of refraction of the prism are known, the limiting angle of the light-collecting face can be easily calculated. This can be done according to the following formula:

$$D = \sin^{-1}(u \sin r) + \sin^{-1} u \sin(A-r) - A$$

where:

$D$ = the angle between the horizontal plane and X
$u$ = the index of refraction of the prism with respect to air
$A$ = the angle Y makes with X
$r$ = the angle between the path of L within the prism and a line at right angles to $$X = \sin^{-1}\left(\frac{1}{u}\right)$$

All of these quantities are known except A which is then solved. After this has been done, the following equation is set up and solved for Y′ which is the angle Y makes with the base of the prism:

$$Y' = A - X'$$

This then gives the limiting value for Y which cannot be shifted clockwise as it would then project the limiting ray L downwardly. However, Y may be shifted counterclockwise as this merely directs L downward more nearly towards the vertical.

In the practice of this invention, it is normally advisable to relate the two faces of the prismatic section so that the limiting ray will project downward at a slight angle from the horizon, such as two or three degrees, so that a safety factor may be obtained to provide for manufacturing deficiencies. Thus, the prismatic section illustrated in Fig. 1 might be modified slightly to take this into consideration by disposing the face Y slightly counterclockwise, such as at three degrees to the vertical instead of nine degrees.

By a further modification of this invention, it is contemplated that the faces X and Y of the prismatic element may be curved in vertical section thus forming a segment of a lens. Such a prism 12 is shown in Fig. 8. This may be done to concentrate a beam of light upon a desired area where this is of advantage. By so doing, it is still possible within the teaching of this invention to restrict the light rays from being deflected upwardly from a horizontal plane, which is one of the main purposes of this invention.

The shield of this invention is shown in combination with an instrument cover in one embodiment in Figs. 3 and 4. Fig. 3 is a plan view of an instrument cover 13 which may be of a molded transparent plastic material. This molded transparent plastic cover includes a face 14, prismatic shield 15 around the lower periphery of the face and a base support 16 at the bottom of the shield. As shown in these figures, the shield 15 comprises the light-collecting face X and the light-projecting face Y which, as pointed out above, can be of a varying angular disposition. The outer surface of the base below the prismatic shield is roughened and coated with a dull black opaque material 17, while the top of the transparent cover or face normally extends through an opening in an opaque portion of an instrument panel and this assembly effects thereby a seal against the undesired leakage of light, such that light can be directed only to the instrument dial.

The instrument cover is shown in a panel assembly in Fig. 5 wherein an opaque face panel 18 and back panel 19 are disposed on either side of a source of illumination 20 which may be a conventional light bulb. An opaque resilient gasket 21 is provided between the face panel and the cover to prevent any possible light leakage therebetween. The cover, the instrument, the back panel, the gasket, and the face panel are all held in place by screws through conventional mounting holes in the instrument flange 30, and a spacer 22 is provided between the face-panel gasket and the base support of the instrument cover to maintain the proper assembly of the various units. The electric light bulb 20, which is a source of illumination, may be provided at a plurality of points around the periphery of the instrument cover and serve fully to illuminate the face of the instrument dial 23 without any leakage of light to the observer by means of the particular shield provided by this invention.

Another embodiment of this invention is shown in the modification of Fig. 6 wherein the same reference numerals are used to designate like parts. This embodiment illustrates a cover 13, instrument dial 23 and panel assembly generally similar to the structure shown in Fig. 5, but including an additional panel 24 whereby a greatly improved concentration and distribution of light on the outer angular face X of the shield is obtained so that the dial is more efficiently illuminated. This additional panel 24 is preferably made of a fluorescent plastic which diffuses and distributes light very efficiently, though it may be made of an ordinary translucent plastic. The circular edge 25 of the panel 24 adjacent the instrument cover is preferably beveled at an angle of approximately thirty degrees to the axis of the panel, as shown, to improve the light concentration and distribution through the shield to the instrument dial, but this angle is not critical in that it does not in any way alter the angle at which the limiting ray is projected from the inner face of the shield. When the circular edge 25 in this plastic illuminating panel is cut at the angle, as described and illustrated, rays of light from the illuminating source are directed through the panel 24 between opaque material 17 and 21 in concentrated rays of light approaching parallelism to the plane of the panel. These rays of light are deflected from edge 25 upwardly at an angle from the horizontal onto the outer angular face X of the cover, with the result that such rays are bent downward less in passing through the prismatic section of the cover and, hence, illuminate the instrument dial near to its center rather than being concentrated near its edge. This plastic panel may be made of colored fluorescent plastic and serves very effectively to collect a maximum amount of the light from the illuminating source in a very efficient manner and to evenly distribute and concentrate the light rays upon the shield for ultimate illumination of the instrument dial.

Another modification of this invention is shown in Fig. 7 which illustrates a cover 13, instrument dial 23, and panel assembly wherein an illuminating plastic panel 24, which may have fluorescent characteristics for efficient light distribution, occupies the entire space between the opaque face panel 28 and the opaque back panel 29, and a source of illumination 27 located within the plastic panel. In this construction, the opaque face and back panels obviously may be of either plastic or metal as determined on the basis of particular structural requirements, although it is usually desirable that the face panel be of plastic cemented to the illuminating plastic panel and engraved through to the illuminating panel at various points to provide auxiliary illuminated markings about the periphery of the instruments.

The source of illumination normally consists of several electric light sources located around the periphery of each instrument cover as in the spaced panel construction described above, but in this instance electric light assemblies 27 are placed in holes in the panels 28, 29 and 24 and arranged so that the light from each assembly is radiated only into the illuminating panel between the back and face panels.

In use: In the device shown in the embodiment of Fig. 5, the light rays from the illumination source 20 are confined between the opaque face panel 18 and the opaque back panel 19 and by means of the coating 17 upon the roughened base support of the instrument panel and the opaque gasket 21 are confined and directed to the face X of the illuminating shield 15 and are projected from the light-projecting face Y below the horizontal plane of the instrument cover downwardly upon the face of the instrument dial 23. The opaque coating 17 upon the roughened base support prevents any direct reflection of light rays striking the base by diffusing and dispensing any rays not thereby absorbed. By means of the positive relationship of this assembly, there is no projection or leakage of light upwardly from the shield to the eyes of the observer inasmuch as the only possible path of light rays from the illuminating source is through the shield because of the light-sealing arrangement pointed out herewith. By means of this arrangement, it is possible to prevent completely the leakage of any light rays from the shield above the horizontal plane through the instrument cover while, at the same time, all of the light rays are directed in such a manner that the instrument dial is itself fully and effectively illuminated. Both of the outer and inner faces X and Y of the shield should be smooth and highly polished to prevent diffusion of the light rays in order that the most efficient utilization of the light be effected.

The modification of Fig. 6 is similar in use to that of the device of Fig. 5, but more efficient and effective utilization of the source of light 20 is made possible by means of the plastic illuminating panel 24. In this embodiment, the maximum amount of the light rays from the source are absorbed in the panel 24 and transmitted onto the outer angular face X of the shield. This is made possible by means of the bevelled cut of the circular edge 25 of the panel 24 which directs upwardly the light rays onto the face X of the shield with the result that the light rays are bent downward less in passing through the prismatic section of the shield and thereby illuminate the instrument dial nearer to its center rather than being concentrated near its edges. The light-sealing arrangement serves in the same manner as discussed above for the device of Fig. 5, since the opaque face panel 18 and the opaque back panel 19 taken together with the coating 17 of the base support of the instrument cover and the opaque gasket 21 serve to prevent any leakage of light rays.

The use of the modified device of Fig. 7 is similar to that of Fig. 6, but here it is to be noted that the electric light assembly 27 is inserted directly into the plastic illuminating panel 24 and there is no spacing between the opaque face and back panels 28 and 29, and the intermediate plastic illuminating panel. By means of this device, the source of light is more efficiently utilized in that there is less absorption and inefficient transmission of the light rays from the illuminating source to the cover shield. The embodiment of this device makes possible the relatively simple assembly of a plurality of sources of illumination, such as electric light bulbs around the periphery of the instrument dial directly into the illuminating panel for easy and quick access, and, at the same time, provides for the simple marking of auxiliary indicia around the periphery of the instrument.

The light rays from the illuminating source 27 in this embodiment radiate within each panel 24 in such a manner that they are projected and transmitted directly onto the face X of the illuminating shield with a minimum waste of energy, and by means of this particular modification, it is possible to obtain a maximum of light concentration from the source so arranged upon the instrument dial without any deflection of light rays upwardly from the horizontal plane through the instrument cover into the eyes of the observer.

Both theory and experiment indicate that in practical embodiments of this invention, good optimum angular dispositions of the light-collecting and light-projecting faces of the prismatic shield, respectively X and Y, may be forty-five degrees and three degrees, respectively, when the prismatic material has an index of refraction of 1.5 as, for instance, Lucite or Plexiglas, which has been used as pointed out above, the angles being measured in the quadrants as described above in the use of the graph of Fig. 2. As long as the values taken from the said graph of Fig. 2 are used without exceeding these limits and by providing for a safety factor of a few degrees on the inner face Y of the shield, such that the limiting ray of light would be directed downwardly within the instrument cover at an angle of approximately three degrees from the plane of the panel, it is possible to use a varied combination of designs with complete and absolute prevention of any light rays being deflected above the horizontal into the eyes of the observer. Accordingly, conventional plastic molding techniques may be used for the construction of this instrument cover and the associated shield and base support, and the design of the cover and shield can be adapted to any panel construction or for particular molding processes.

As has been pointed out above, the faces X and Y of the prismatic shield may be in various shapes and angular dispositions as long as they are properly related to direct the light in the manner above described. They may take the form of curved vertical sections or may consist of two slightly different angular portions on each face or any combination thereof as long as the proper relationship of the graph of Fig. 2 is observed so as to direct and confine the transmitted light in the manner above described.

Since many changes could be made in the modifications of this invention, as pointed out above, and since many apparently widely different embodiments of this invention could be made without departing from the scope hereof, it is intended that all matter contained in the above description, as shown in the accompanying drawings, shall be interpreted as illustrative and not in a limiting sense. All such modifications as come within the scope of the following claims are considered to be a part of this invention.

What is claimed is:

1. A device having a surface which is to be illuminated, said device comprising prism means for receiving and projecting illumination interposed between said surface and a source of illumination, said prism means including a prism of transparent material having a greater index of refraction than air and including a smooth light-collecting surface and a smooth light-projecting surface spaced therefrom at an angle thereto for directing light therefrom toward said surface to be illuminated, said angle being determined by the limiting light ray which emerges from said light-projecting surface in substantially parallelism with the surface to be illuminated, said prism means being further provided with means for absorbing direct rays of light from the light-collecting face which otherwise would be reflected within the prism on to the light-projecting face, said absorbing means being within the prism at the base beneath said light-collecting surface and said light-projecting surface, said last-named means comprising a roughened surface coated by a light absorbing material.

2. A device having a surface to be illuminated and a transparent cover plate spaced thereabove, said device comprising a fluorescent light-receiving and conducting element spaced at one side of said surface and said cover and between separate planes passing through the surface and the cover, said element also being positioned between a source of illumination and said surface, means on said light-receiving element for collecting rays of illumination from any angle capable of transmitting light through said element and projecting them entirely toward the plane of said surface, said means including a light-transmitting surface on said element slanting upwardly and generally toward said surface to be illuminated and a transparent prism having a light-collecting surface and a light-projecting surface positioned intermediate said element and the surface to be illuminated for directing substantially all projected rays of light within and away from said cover, said prism having its light-collecting face slanting upwardly and toward said surface to be illuminated and separated from said above-mentioned element by an air gap, said prism further having its light-projecting surface disposed with respect to said light-collecting surface at an angle to direct limiting light rays striking the light-collecting surface closely approaching parallelism therewith beneath a plane parallel to said surface to be illuminated and away from said cover, said angle being such that the angle of deviation for the limiting ray is at least equal to the angle said light-collecting surface makes with said parallel plane.

3. A device having a surface to be illuminated and a transparent cover plate spaced thereabove, said device comprising a fluorescent light-receiving and conducting element spaced at one side of said surface and said cover, and between separate planes passing through the surface and the cover, said element also being positioned between a source of illumination and said surface, means on said light-receiving element for collecting rays of illumination from any angle capable of transmitting light through said element and projecting them entirely toward the plane of said surface, said means including a light-transmitting surface on said element slanting upwardly and generally toward said surface to be illuminated and a transparent prism having a light-collecting surface and a light-projecting surface positioned intermediate said element and the surface to be illuminated for directing substantially all projected rays of light within and away from said cover, said prism having its light-collecting face slanting upwardly and toward said surface to be illuminated and separated from said above-mentioned element by an air gap, said prism further having its light-projecting surface disposed with respect to said light-collecting surface at an angle to direct limiting light rays striking the light-collecting surface closely approaching parallelism therewith beneath a plane parallel to said surface to be illuminated, and away from said cover, said angle being such that the angle of deviation for the limiting ray is at least equal to the angle said light-collecting surface makes with said parallel plane, said prism being further provided with means for absorbing reflected rays of light with the prism at the base beneath said light-collecting surface and said light-projecting surface, said last-named means comprising a roughened surface backed by an opaque material.

4. A device having a surface to be illuminated and a transparent cover plate spaced thereabove, said device comprising a light-conducting element spaced at one side of said surface and said cover, and between separate planes passing through the surface and the cover, said element also being spaced between a source of illumination and said surface, a transparent prism having a light-collecting surface and a light-projecting surface, means on said light-conducting element for collecting rays of illumination and projecting them from a light-emitting face on to said prism, said prism being spaced intermediate said element and the surface to be illuminated for directing substantially all projected rays of light within said cover, said light-projecting surface being disposed with respect to said light-collecting surface at an angle to direct limiting light rays striking the light-collecting surface closely approaching parallelism therewith beneath a plane parallel to said surface to be illuminated and away from said cover, and means for channeling light opening in one direction to the source of illumination and in another direction to said light-collecting surface, said light-channeling means confining the light-conducting element for absorbing and confining light to said light-collecting surface, said light-conducting element being spaced from said light-collecting surface and having its light-emitting face disposed for transmitting light to said light-collecting surface in an angular direction.

5. A device having a surface to be illuminated and a transparent cover plate spaced thereabove, said device comprising a light-conducting element spaced at one side of said surface and said cover and between separate planes passing through the surface and the cover, said element also being spaced between a source of illumination and said surface, a transparent prism having a light-collecting surface and a light-projecting surface, means on said light-conducting element for collecting rays of illumination and projecting them from a light-emitting face on to said prism, said prism being spaced intermediate said element and the surface to be illuminated for directing substantially all projected rays of light within said cover, said light-projecting surface being disposed with respect to said light-collecting surface at an angle to direct limiting light rays striking the light-collecting surface closely approaching parallelism therewith beneath a plane parallel to said surface to be illuminated and away from said cover, and means for channeling light opening in one direction to the source of illumination and in another direction to said light-collecting surface, said light-channeling means confining the light-conducting element for absorbing and confining light to said light-collecting surface, said light-conducting element being spaced from said light-collecting surface and having its light-emitting face disposed for transmitting light to said light-collecting surface in an angular direction, and means for absorbing reflected light rays within said light-conducting element comprising roughened surfaces bounding said light-emitting face backed by an opaque material.

6. A device having a surface to be illuminated and a transparent cover plate spaced thereabove, said device comprising a light-conducting element spaced at one side of said surface and said cover and between separate planes passing through the surface and the cover, said element also being spaced between a source of illumination and said surface, a transparent prism having a light-collecting surface and a light-projecting surface, means on said light-conducting element for collecting rays of illumination and projecting them from a light-emitting face on to said prism, said prism being spaced intermediate said element and the surface to be illuminated for directing substantially all projected rays of light within said cover, said light-projecting surface being disposed with respect to said light-collecting surface at an angle to direct limiting light rays striking the light-collecting surface closely approaching parallelism therewith beneath a plane parallel to said surface to be illuminated and away from said cover, and means for channeling light opening in one direction to the source of illumination and in another direction to said light-collecting surface, said light-channeling means confining the light-conducting element for absorbing and confining light to said light-collecting surface, said light-conducting element being spaced from said light-collecting surface and having its light-emitting face disposed for transmitting light to said light-collecting surface in an angular direction, and means for absorbing reflected light rays within said light-conducting element comprising roughened surfaces bounding said light-emitting face backed by an opaque material, and further means for absorbing reflected light rays within said prism comprising a roughened base between said light-collecting and light-transmitting surface backed by an opaque material.

References Cited in the file of this patent
UNITED STATES PATENTS

| | | |
|---|---|---|
| 2,202,142 | Carter | May 28, 1940 |
| 2,507,035 | Maynard | May 9, 1950 |
| 2,537,971 | Dames | Jan. 16, 1951 |
| 2,595,973 | Neugass | May 6, 1952 |
| 2,616,389 | Little et al. | Nov. 4, 1952 |
| 2,654,020 | Pittman | Sept. 29, 1953 |
| 2,695,354 | Neugass | Nov. 23, 1954 |